UNITED STATES PATENT OFFICE.

SAMUEL ERNEST LINDER, OF BUCKHURST-HILL, AND RUDOLF LESSING, OF LONDON, ENGLAND, ASSIGNORS TO HYDRONYL SYNDICATE, LIMITED, OF LONDON, ENGLAND.

PROCESS OF NEUTRALIZING AND DRYING COMMERCIAL AMMONIUM SULFATE.

1,377,493.     Specification of Letters Patent.     Patented May 10, 1921.

No Drawing.     Application filed June 2, 1919. Serial No. 301,280.

*To all whom it may concern:*

Be it known that we, SAMUEL ERNEST LINDER, B. Sc., a subject of the King of Great Britain and Ireland, and residing at Leodholt, The Drive, Buckhurst Hill, in the county of Essex, England, and RUDOLF LESSING, Ph. D., a subject of the King of Great Britain and Ireland, and residing at Southampton House, 317 High Holborn, London, W. C. 2, England, have invented certain new and useful Improvements in or Relating to Processes of Neutralizing and Drying Commercial Ammonium Sulfate, of which the following is a specification.

This invention has for its object to provide sulfate of ammonia in a form which, for instance, renders it more conveniently handled and distributed than is the usual commercial product.

Sulfate of ammonia as ordinarily manufactured contains a proportion of free sulfuric acid, the presence of which renders the salt hygroscopic, and has a destructive effect upon woodwork and other material with which the salt is brought into contact, causes damage for instance to the bags in which it is packed for transport, and renders the salt less suitable for agricultural and horticultural use.

The presence of acid in the salt may be due at least in part to the fact that the acid employed has not been completely neutralized in the saturaters or to the fact that in evaporating solutions of ammonium sulfate, hydrolysis occurs with the result that the solutions even though originally neutral or alkaline become acid. Such being the case, the addition to the solution containing ammonium sulfate prior to or at intervals during concentration to effect the separation of sulfate of ammonia, of ammonia solution or sodium carbonate, as has been proposed, will not have the effect of producing a sulfate of ammonia free from acid.

The invention is based upon the observation that by subjecting commercial sulfate of ammonia to the action of an agent adapted to effect the neutralization of free sulfuric acid, which agent is normally solid, and simultaneously to agitation and drying, a dry product of satisfactory physical properties may be obtained.

When in accordance with the invention the sulfate of ammonia is also subjected to treatment to effect the mechanical reduction of the salt, a dry and granular or pulverulent product is obtained.

We have also found that by neutralizing sulfate of ammonia and drying it under suitable conditions, as for instance, by heating the sulfate in a partial vacuum or in a gas current, the pyridin normally contained in the commercial salt can be removed and recovered.

As agents adapted to effect the neutralization of the sulfuric acid contained in the commercial sulfate of ammonia, basic materials, as, for instance, lime, magnesia or other alkaline earths or their carbonates, fixed alkalis or their carbonates, suitable ammonium salts as, for example the carbonate, sulfid or sulfite of ammonia or commercial products containing these salts may be employed.

These substances may be added to the sulfate of ammonia in association with water as solutions or suspensions as the case may be, or they may be added thereto in the substantially dry state.

In carrying the invention into effect, apparatus of the kind comprising a rotating treatment chamber in the form, for instance, of a cylinder into which the material to be treated is charged intermittently or continuously and having means whereby gases or vapors may be withdrawn from the chamber and preferably also means for heating the contents thereof may be employed.

The apparatus may be of the kind containing grinding bodies as, for instance, balls or pebbles.

The drying may be effected as above indicated by heating means associated with the treatment chamber, or alternatively, or in addition by means of heated gases passed through the chamber.

The gases and vapors exhausted from the chamber may be treated, as above indicated, for the recovery of pyridin and any ammonia, to which end they may be passed through a device adapted to effect the condensation or absorption of these substances with or without the employment of a suitable absorbent. Thus, for instance, the said gases or vapors may be passed through a scrubber or tower fed with water or an acid solution or with an oil.

The following particulars are given by way of example, to illustrate certain ways in which the invention may be carried into effect:—

A hundred parts of sulfate of ammonia, which may contain, say, two parts water and 0.4 part sulfuric acid apart from other impurities, are charged into the drum of a ball mill containing a light charge of balls or pebbles and heated by gas burners or other means, and 0.4 part dry hydrated lime in powder form is added. If ammonium carbonate is used the quantity added is slightly greater.

The drum is then rotated and neutralization takes place very quickly. Air is blown or sucked through the drum which is for this purpose provided with hollow trunnions, the escaping air charged with moisture together with any excess ammonia or pyridin which may be given off, being passed through a scrubber for instance, supplied with an acid solution of sulfate of ammonia, such as mother liquor from the saturater. When gas burners are employed as heating means, the hot products of combustion of the gas may be confined within a hood or casing and it may be convenient to form the bottom of this in the shape of a hopper to be used for the discharge of the treated sulfate of ammonia.

For a charge of from two to four cwt. from twenty minutes' to thirty minutes' drying will be found sufficient; after this the air current is cut off and the sulfate is discharged in the usual manner by placing a grid in the manhole and rotating the drum.

If continuous working is desired, a plant of the tube mill type will be found convenient. In this case the air enters the plant where the finished product is discharged and leaves at the end where the sulfate and its neutralizing agent are introduced.

When it is desired to make a salt free from pyridin sufficient neutralizing agent should be added to satisfy the free acid and the acid combined with the pyridin in the original sulfate. Thus, when using volatile ammonium salts, we have been able to produce sulfate of ammonia having an ammonia content equal to that of the chemically pure salt, retaining only a trace of moisture, the granular product consisting of broken crystals and resembling silver sand and being of a chemical and physical quality hitherto unknown as a commercial article.

Having now described our invention, what we claim as new and desire to secure by Letters Patent is:—

1. The process of treating commercial sulfate of ammonia which comprises subjecting the sulfate to the action of an agent adapted to affect the neutralization of free sulfuric acid, which agent is normally solid and simultaneously to agitation and to the removal of water.

2. The process of treating commercial sulfate of ammonia which comprises subjecting the sulfate to the action of an agent adapted to effect the neutralization of free sulfuric acid, which agent is normally solid, and simultaneously to agitation, the removal of water and mechanical reduction.

3. The process of treating commercial sulfate of ammonia which comprises subjecting the sulfate to the action of an agent adapted to effect the neutralization of free sulfuric acid, which agent is normally solid, and simultaneously to agitation in a gas current to effect drying.

4. The process of treating commercial sulfate of ammonia which comprises subjecting the sulfate to the action of an agent adapted to effect the neutralization of free sulfuric acid, which agent is normally solid, and simultaneously to agitation, the action of a gas current and to mechanical reduction.

5. The process of treating commercial sulfate of ammonia which comprises subjecting the sulfate to the action of an agent adapted to effect the neutralization of free sulfuric acid, which agent is normally solid, and simultaneously to agitation, and to the action of heat and a gas current to effect drying.

6. The process of treating commercial sulfate of ammonia which comprises subjecting the sulfate to the action of an agent adapted to effect the neutralization of free sulfuric acid, which agent is normally solid, and simultaneously to agitation and to the action of heat and a gas current to effect drying, and to mechanical reduction.

7. The process of treating commercial sulfate of ammonia which comprises subjecting the sulfate to the action of an agent adapted to effect the neutralization of free sulfuric acid, which agent is normally solid, and simultaneously to agitation and to the action of heat and a gas current to effect the vaporization of water and pyridin.

8. The process of treating commercial sulfate of ammonia which comprises subjecting the sulfate to the action of an agent adapted to effect the neutralization of free sulfuric acid, which agent is normally solid, and simultaneously to agitation and to the action of heat and a gas current to effect the vaporization of water and pyradin.

In testimony whereof we have signed our names to this specification.

SAMUEL ERNEST LINDER,
RUDOLF LESSING.